(12) United States Patent
Scheurer, II et al.

(10) Patent No.: US 8,353,552 B2
(45) Date of Patent: Jan. 15, 2013

(54) VEHICLE SEAT WITH STRIKER MECHANISM

(75) Inventors: Jeffrey Scheurer, II, Marysville, OH (US); Terrie Ellison, Hilliard, OH (US); Trenton Hobbs, Marysville, OH (US); Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 233 days.

(21) Appl. No.: 12/871,367

(22) Filed: Aug. 30, 2010

(65) Prior Publication Data

US 2012/0049560 A1 Mar. 1, 2012

(51) Int. Cl.
*B60N 2/10* (2006.01)
*B60N 2/30* (2006.01)

(52) U.S. Cl. ............... 296/65.16; 296/65.09; 297/378.13
(58) Field of Classification Search ............... 296/65.01, 296/65.09, 65.16; 297/378.13
See application file for complete search history.

(56) References Cited

U.S. PATENT DOCUMENTS

| 4,445,722 | A | | 5/1984 | Schaper | |
|---|---|---|---|---|---|
| 4,484,776 | A | | 11/1984 | Gokimoto et al. | |
| 4,609,221 | A | * | 9/1986 | Bottcher | 296/65.09 |
| 5,398,995 | A | | 3/1995 | Hurite | |
| 5,527,087 | A | | 6/1996 | Takeda et al. | |
| 5,562,325 | A | * | 10/1996 | Moberg | 297/378.13 |
| 5,741,046 | A | | 4/1998 | Leuchtmann et al. | |
| 6,012,776 | A | * | 1/2000 | Schneider et al. | 297/378.12 |
| 6,132,000 | A | | 10/2000 | Tanaka | |
| 6,312,055 | B1 | * | 11/2001 | Uematsu | 297/378.13 |
| 6,341,820 | B1 | | 1/2002 | Kimura et al. | |
| 7,556,315 | B2 | | 7/2009 | Nathan et al. | |
| 7,641,282 | B2 | * | 1/2010 | Hinata et al. | 297/216.14 |
| 7,658,430 | B2 | * | 2/2010 | Zielinski et al. | 296/65.16 |
| 7,931,338 | B2 | * | 4/2011 | Lindsay | 297/378.13 |
| 2008/0061617 | A1 | * | 3/2008 | Zielinski et al. | 297/378.13 |
| 2010/0276977 | A1 | * | 11/2010 | Lindsay | 297/363 |
| 2011/0233982 | A1 | * | 9/2011 | Lindsay | 297/378.13 |
| 2012/0025557 | A1 | * | 2/2012 | Lindsay et al. | 296/65.16 |
| 2012/0049560 | A1 | * | 3/2012 | Scheurer et al. | 296/65.09 |

FOREIGN PATENT DOCUMENTS

| JP | 05270305 | 10/1993 |
|---|---|---|
| WO | 9312952 | 7/1993 |

* cited by examiner

*Primary Examiner* — Glenn Dayoan
*Assistant Examiner* — Gregory Blankenship
(74) *Attorney, Agent, or Firm* — Rankin Hill & Clark LLP

(57) ABSTRACT

A vehicle seat includes a seat base, a seat back, and a striker. The seat back connects with the seat base for pivotal movement about a pivot axis. The striker is moveable in a linear direction between a retracted position where the striker is disposed in the seat back and an extended position where the striker extends from the seat back for engaging an associated latch. Movement of the seat back in a first direction, which is toward the seat base, results in the striker moving toward the retracted position. Movement of the seat back in a second direction, which is away from the seat base, results in the striker moving toward the extended position.

20 Claims, 6 Drawing Sheets

VEHICLE SEAT WITH STRIKER MECHANISM

BACKGROUND

Exemplary embodiments herein relate to a vehicle seat for a motor vehicle. Many sedans, coupes, CUVs and SUVs have folding seats with high-latch strikers where the striker is located high on the seat back and the striker engages with a latch on the vehicle body. When the striker is located high on the seat back of the vehicle seat and the latch is on the vehicle body, a horizontally-oriented striker can catch a seat belt and drag webbing of the seat belt toward the latch where the webbing could be damaged. This problem often occurs where the available width of the vehicle prevents a seat belt D-ring from being located far enough outboard with respect to the vehicle seat to route the webbing outward of the area where the striker engages the latch.

Vehicle seats employing these horizontal strikers in vehicles not having the adequate aforementioned width can require the operator to pull the seat belt webbing out of the way of the latch area to prevent damage to the seat belt webbing. Some other redirection device or operation to pull the seat belt webbing out of the way, such as an elastic band or presenter arm, could also alleviate this problem. This other redirection device, however, adds cost to the vehicle.

A pivoting striker that pivots outwardly from an outboard lateral edge of a vehicle seat to a horizontal orientation is also known. Such a pivoting striker, however, requires a complicated linkage mechanism to move the striker from a retracted vertical position to the horizontally extended position. Moreover, such a pivoting striker mechanism may not alleviate the problem of the horizontally oriented striker catching the seat belt webbing and dragging the seat belt webbing toward the latch if the striker mechanism pivots outwardly before passing by the seat belt.

SUMMARY

A vehicle seat that can overcome at least some of the aforementioned shortcomings includes a seat base, a seat back, and a striker. The seat back connects with the seat base for pivotal movement about a pivot axis. The striker is moveable in a linear direction between a retracted position where the striker is disposed in the seat back and an extended position where the striker extends from the seat back for engaging an associated latch. Movement of the seat back in a first direction, which is toward the seat base, results in the striker moving toward the retracted position. Movement of the seat back in a second direction, which is away from the seat base, results in the striker moving toward the extended position.

An example of a motor vehicle that can overcome at least some of the aforementioned shortcomings includes a structural pillar, a latch, a vehicle seat, a seat belt assembly, and a striker mechanism. The latch is on the structural pillar, the vehicle seat includes a seat base and a seat back connected with the seat base for pivotal movement about a pivot axis. The seat belt assembly includes a webbing section extending from the structural pillar. The striker mechanism is on the seat back. The striker mechanism includes a striker moveable in a linear direction between a retracted position where the striker is disposed in the seat back and an extended position where the striker extends from the seat back to engage the latch. The striker mechanism is configured such that movement of the seat back in a first direction, which is toward the seat base, results in the striker moving toward the retracted position. The striker mechanism is also configured such that movement of the seat back in a second direction, which is away from the seat back, results in the striker moving toward the extended position.

Another example of a vehicle seat that can overcome at least some of the aforementioned shortcomings includes a seat base, a seat back, a receptacle, a striker, a biasing member, and a retaining member. The seat back connects with the seat base for pivotal movement about a pivot axis. The receptacle is in the seat back. The striker is in the receptacle and moveable in a linear direction between a retracted position where the striker is disposed in the receptacle and an extended position where the striker extends from the receptacle. The biasing member biases the striker towards the extended position. The retaining member is moveable between a first operating position where the retaining member engages with the striker to retain the striker in the retracted position and a second operating position where the retaining member disengages from the striker so that the striker is biased toward the extended position.

DETAILED DESCRIPTION

Figure 1:
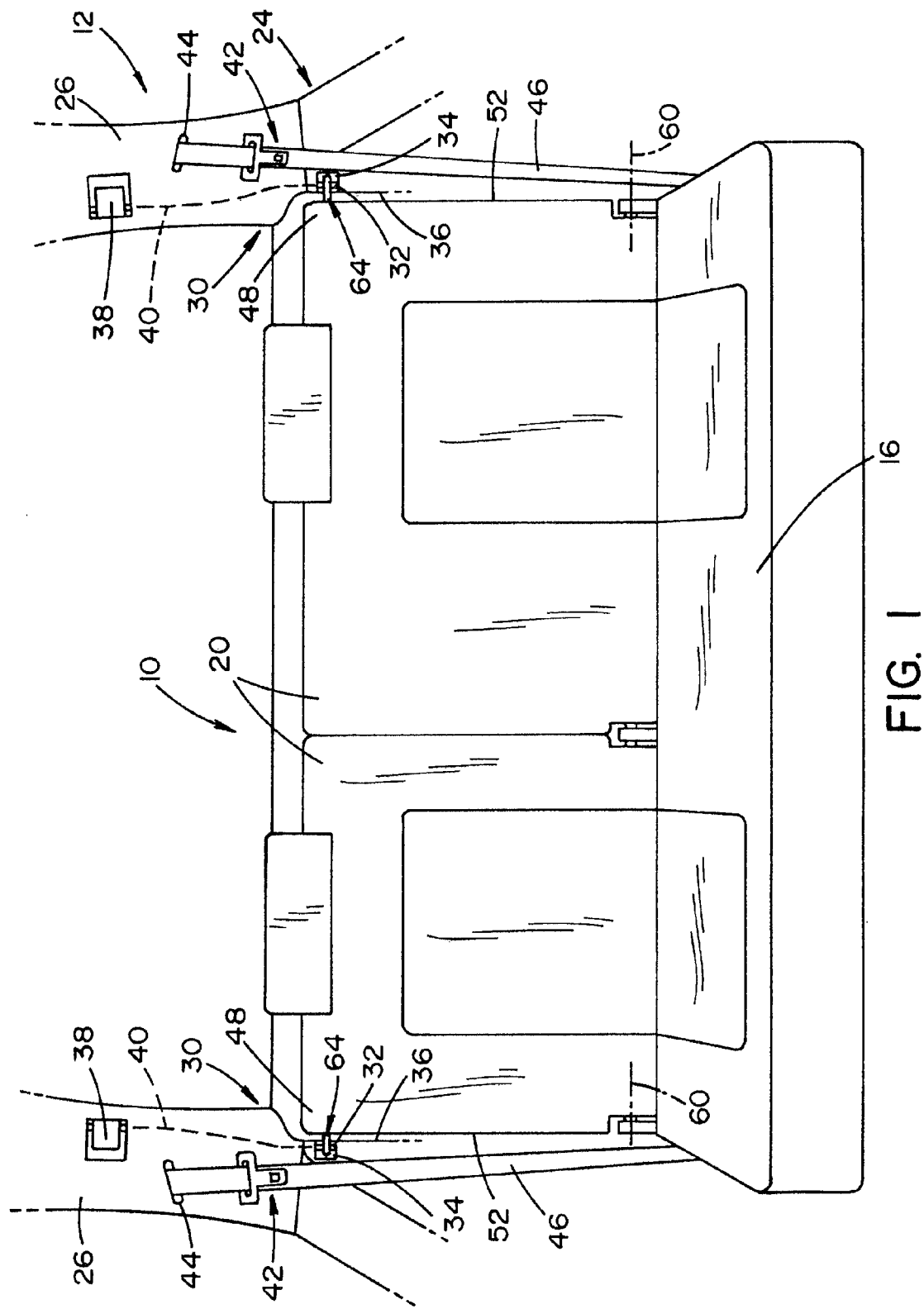
FIG. 1 is a front schematic view of a vehicle seat for a vehicle with a seat back of the vehicle seat shown in an upright, locked position.

The descriptions and drawings herein are merely illustrative and various modifications and changes can be made in the structures disclosed without departing from the present disclosure. Various identified components of a vehicle disclosed herein are merely terms of art and may vary from one vehicle manufacturer to another. These terms should not be deemed to limit the present disclosure. All references to direction and position, unless otherwise indicated, refer to the orientation of the vehicle and vehicle seat illustrated in the drawings and should not be construed as limiting the appended claims. Like numerals refer to like parts throughout the several views.

Figure 2:
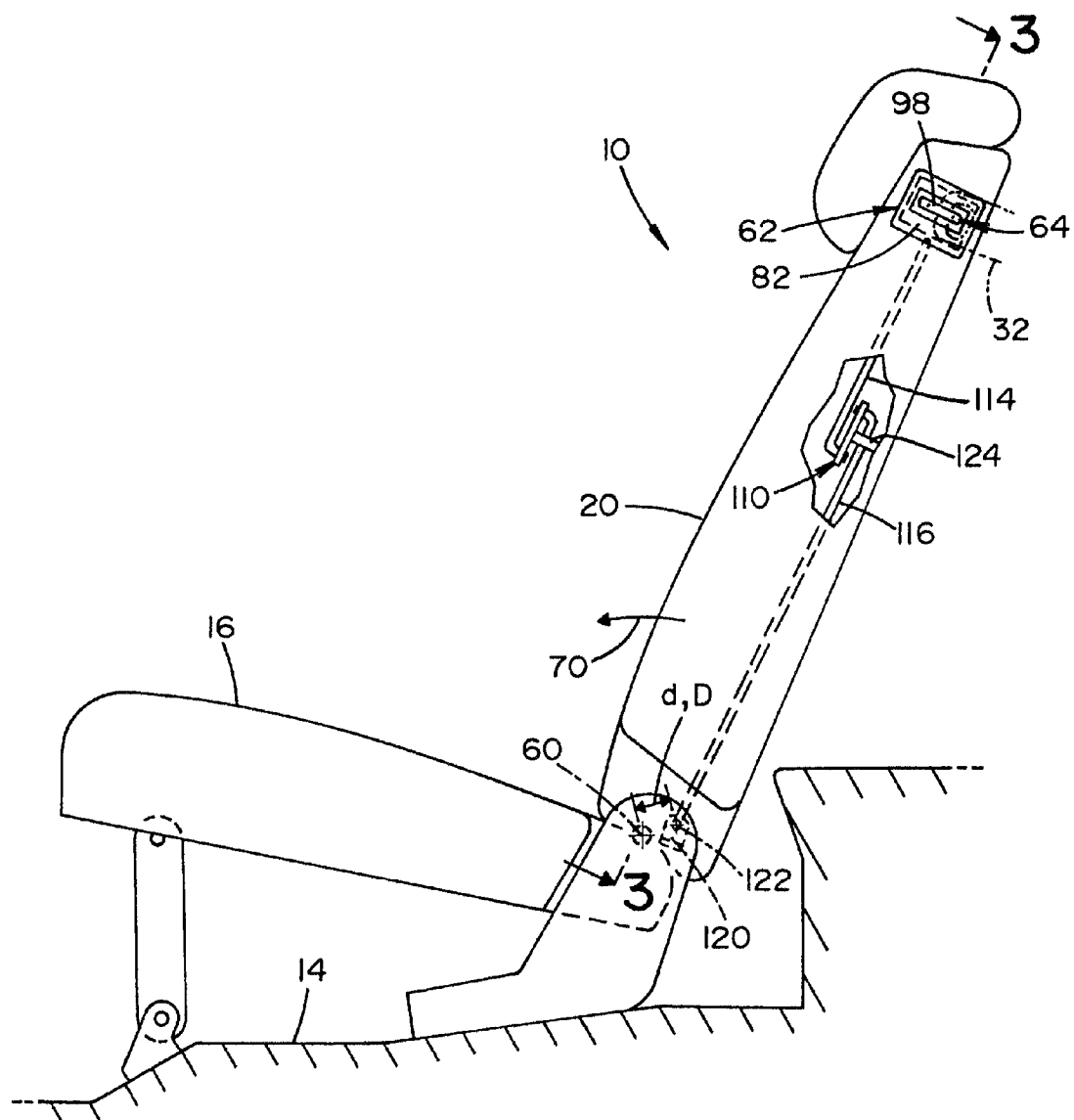
FIG. 2 is a side schematic view of the vehicle seat shown in FIG. 1, where a portion of a seat back is broken away, depicting the seat back in the upright, locked position.

Referring now to the drawings, which are shown for the purposes of illustrating one or more exemplary embodiments and are not for purposes of limiting the appended claims, FIG. 1 schematically illustrates a vehicle seat 10 mounted within an interior of a vehicle 12 (only a portion of which is shown). With reference to FIG. 2, the seat 10 mounts to a floor 14 of the vehicle. The vehicle seat 10 depicted in FIG. 1 is a rear seat including a seat base 16 and a seat back 20. Internal frame members for the seat base 16 and the seat back 2Q are not shown; however, the frame members can be conventional. The seat 10 is illustrated as a split-back type seat (two seat backs connect with a single seat base), though alternative seat configurations, such as a bench-type seat or separated cabin-type seats (each including a seat back and a seat base) are also contemplated.

The vehicle 12 also includes a vehicle body 24 that includes a structural pillar 26 (a left structural pillar and a right structural pillar are shown in FIG. 1). In the embodiment illustrated in FIG. 1, the structural pillar 26 is a D-pillar, which is typically located toward the rear of the vehicle 12. A latch mechanism 30, which includes a movable latch 32, is located on the structural pillar 26. The latch 32 is located in a latch receptacle 34 formed in the structural pillar 26 where the opening into the receptacle is generally flush with an inboard lateral surface 36 of the structural pillar. A latch release handle 38 is shown located on the structural pillar 26 in the illustrated embodiment; however, the latch release handle 38 can be located elsewhere. The latch release handle 38 is operably connected to the latch 32 via a cable 40 (depicted schematically). Movement of the latch release handle 38 results in movement of the latch 32. More particularly, as illustrated in FIG. 1, rotation of the latch release handle 38 about a vertical axis results in movement of the latch 32 from a latched position to an unlatched position. The latch 32 can be biased toward the latched position.

With further reference to FIG. 1, the motor vehicle 12 also includes a seat belt assembly 42 mounted to the vehicle body 24 at the structural pillar 26. In the illustrated embodiment, the seat belt assembly 40 includes an insertion member 44 (or D-ring) connected to the structural pillar 26 and seat belt webbing 46. A retractor (not shown) that retracts the seat belt webbing 46 into the structural pillar 26 can be located within the structural pillar. As illustrated, the insertion member 44 is located adjacent to an upper outboard corner 48 of each seat back 20 when the seat back is in the upright, locked position.

The seat belt webbing 46 is threaded through the insertion member 44 and a section of the seat belt webbing extends along a lateral outboard side 52 of the seat back 20 and the inboard lateral surface 36 of the structural pillar 26. The seat belt assembly 42 operates in much the same manner as known conventional seat belt assemblies; therefore, further description of the seat belt assembly is not provided.

As discussed above, the vehicle seat 10 includes the seat base 16 and seat back 20. With reference to FIG. 2, the seat back 20 connects with the seat base 16 for pivotal movement about a pivot axis 60. The seat back 20 pivots with respect to the seat base 16 between a locked, upright position (shown in FIGS. 1-3) and a stowed position (FIGS. 4 and 5) where the seat back is pivoted toward, and can rest on, the seat base.

Figure 3:
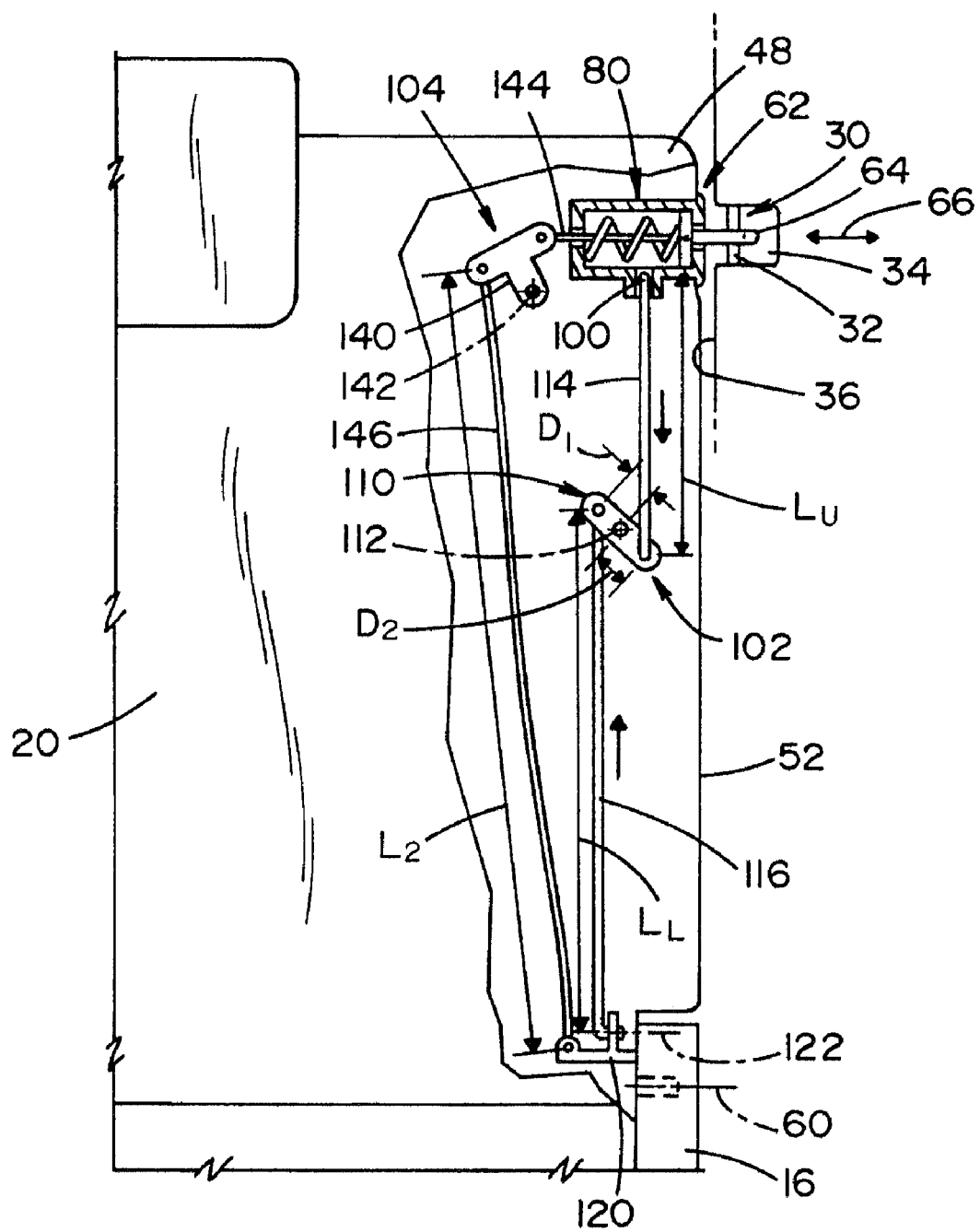
FIG. 3 is a cross-sectional view taken generally along line 3-3 in FIG. 2.

With reference to FIG. 3, a striker mechanism 62 is associated with the seat back 20 to lock the seat back in the locked, upright position (as shown in FIGS. 1-3). The striker mechanism 62 cooperates with the latch mechanism 30 to latch the seat back 20 to the structural pillar 26 to inhibit movement of the seat back with respect to the seat base 16. The latch mechanism 30 is located rearwardly with respect to the seat belt webbing 46. Where the gap between the lateral outboard side 52 of the seat back 20 and the inboard lateral surface 36 of the structural pillar 26 (or the vehicle body) is small enough, the striker mechanism 62, which includes a striker 64, may engage the seat belt webbing 46 and drag the seat belt webbing toward the latch mechanism 30, unless the striker is moved out of the way of the seat belt webbing or the seat belt webbing is moved out of the way of the striker.

With continued reference to FIG. 3, the striker mechanism 62 on the seat back 20 includes the striker 64, which is moveable in a linear direction 66. The striker 64 is moveable between a retracted position (FIGS. 4 and 5) where the striker is disposed in the seat back 20 and an extended position (FIGS. 1-3) where the striker 64 extends from and beyond the lateral outboard side 52 of the seat back 20. The linear direction 66 is aligned with a lateral (inboard/outboard) direction of the vehicle 12. As will be described in further detail below, the striker mechanism 62 and the striker 64 are configured such that movement of the seat back 20 in a first direction 70 (FIG. 2), which is toward the seat base 16, results in the striker 64 moving towards the retracted position. The striker mechanism 62 and the striker 64 are also configured such that movement of the seat back 20 in a second direction 72 (FIG. 4), which is away from the seat base 16, results in the striker 64 moving toward the extended position. In the embodiment illustrated in the figures, the striker 64 moves from the retracted position to the extended position after the striker 62 has moved rearwardly beyond the webbing section 46 of the seat belt assembly 40 when moving in the second direction 72. Such a configuration can minimize the lateral gap between the inboard lateral surface 36 of the structural pillar 26 (or the vehicle body) and the lateral outboard side 52 of the seat back 20 while lessening the likelihood of the striker 64 catching the webbing 46 and dragging the webbing towards the latch mechanism 30. In the embodiment illustrated in the figures, the striker 64 can also move from the extended position toward the retracted position before the striker 62 has moved forwardly to where the webbing section 46 of the seat belt assembly 40 is located when moving in the first direction 70.

Figure 3A:
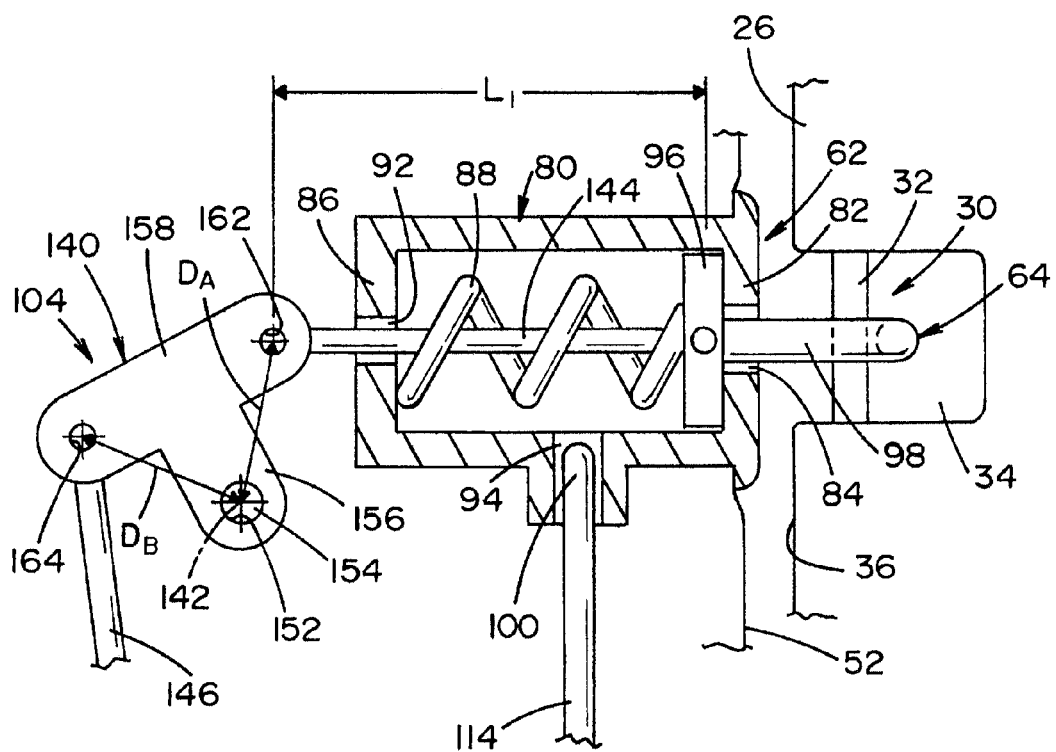
FIG. 3A is a close-up view of a striker mechanism and a portion of two linkages that cooperate with the striker mechanism for the vehicle seat shown in FIG. 1.

With reference to FIG. 3, a receptacle 80 is located in the seat back 20 adjacent the upper outboard corner 48 of the seat back. With reference to FIG. 3A, the receptacle 80 includes an outboard wall 82 defining an outboard opening 84 through which at least a portion of the striker 64 extends when in the extended position. The outboard lateral wall 82 extends slightly beyond the lateral outboard side 52 of the seat back 20 and generally parallel therewith. The receptacle 80 can be made from plastic or another rigid material and also includes an inboard wall 86 that provides a seating surface for a biasing member 88, which will be described in more detail below. The receptacle 80 can also mount to the internal frame (not shown) of the seat back 20. An inboard opening 92 is formed through the inboard wall 86. A lower opening 94 is also provided in the receptacle 80.

With continued reference to FIG. 3A, the striker 64 includes a base 96, which can be plate shaped, and a U-shaped bar 98 extending generally normal to the base. The latch 32 of the latch mechanism can engage the U-shaped bar 98 to retain the seat back 20 in the locked, upright position. The biasing member 88 is disposed within the receptacle 80 and acts against the base 96 and the inboard wall 86 to bias the latch 64 in an outboard direction toward the extended position. The base 96 contacts the outboard lateral wall 82 of the receptacle 80 to limit further outboard travel of the striker 64. In the illustrated embodiment, the biasing member 88 is a conventional compression spring; however, other conventional biasing members could be employed.

Figure 4:
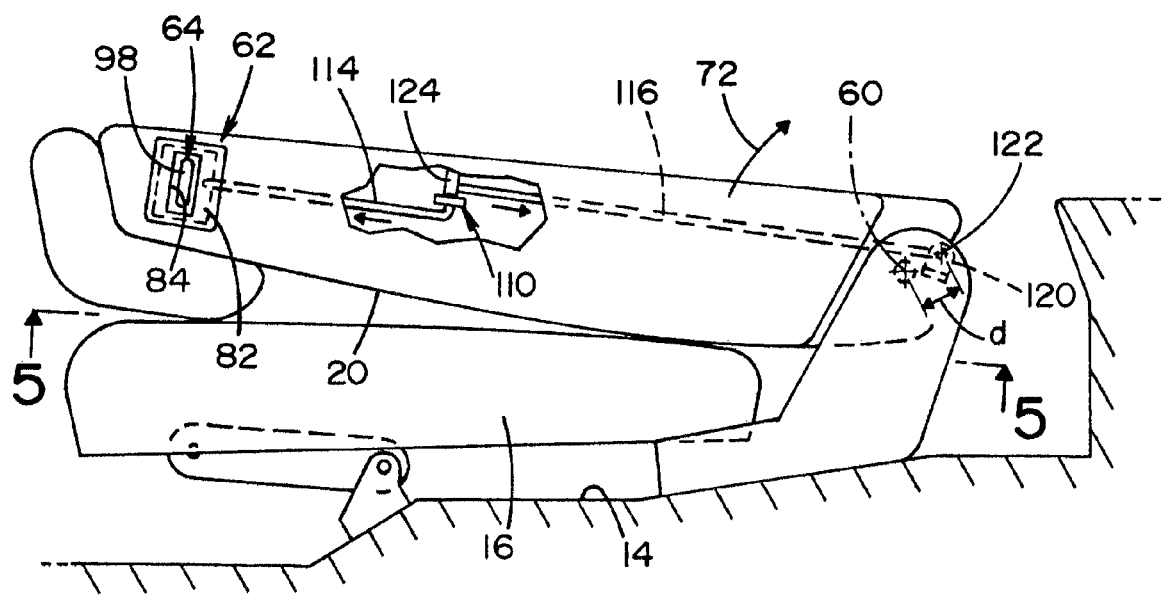
FIG. 4 is a side schematic view of the vehicle seat shown in FIG. 1, where a portion of a seat back is broken away, depicting the seat back in a stowed position.

The vehicle seat 10 also includes a retaining member 100 movable between a first operating position (FIGS. 4 and 5) where the retaining member engages with the striker 64 to retain the striker in the retracted position and a second operating position (FIGS. 1-3) where the retaining member disengages from the striker so that the striker is biased toward the extended position. With reference back to FIG. 3, the seat 10 can further include a first linkage 102 connected with the retaining member 100 and a second linkage 104 connected with the striker 64. The first linkage 102, which is connected with the retaining member 100, moves the retaining member from the first operating position, in which the retaining member engages the striker 64 to retain the striker in the retracted position, to a second operating position, in which the retaining member disengages from the striker, in response to movement of the seat back 20 away the seat base 16. In other words, the first linkage 102 moves the retaining member 100 between the first operating position and the second operating position in response to the seat back 20 moving in the second direction 72 (FIG. 4). In the illustrated embodiment, the first linkage 102 includes a lever 110 pivotable about a lever axis 112, a first (upper) linkage member 114 connected to the lever 110 on a first side of the lever axis 112 and a second (lower) linkage member 116 connected to the lever 110 on a second, opposite, side of the lever axis. The first linkage member 114 also connects to the retaining member 100, and in the illustrated embodiment, the retaining member is a distal end of the first linkage member. The second linkage member 116 is also pivotally fixed to the seat base 16. In the illustrated embodiment, the linkage members 114, 116 are rigid rods.

Figure 5:
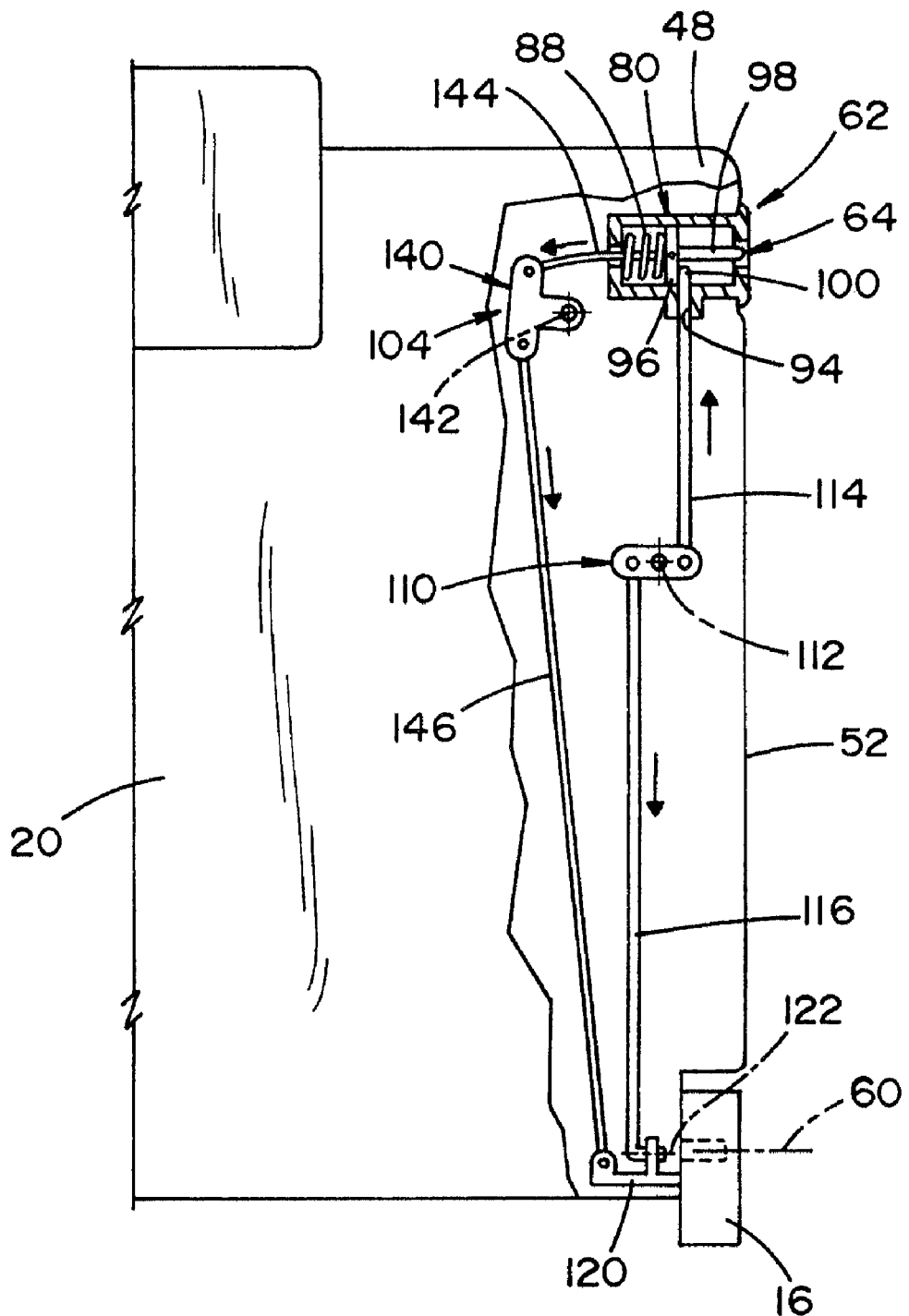
FIG. 5 is a cross-sectional view taken generally along lines 5-5 in FIG. 4.

With reference to FIG. 5, when the retaining member 100 is in the first operating position, the retaining member extends through the lower opening 94 in the receptacle 80 to engage the base 96 of the striker 64 to retain the striker in the retracted position. During movement of the seat back 2Q away from the seat base 16, the retaining member 100 moves out of engagement with the base 96 of the striker 64 so that the biasing member 88 biases the striker 64 in the linear direction 66 toward the extended position. To perform this operation, the lower linkage member 116 is pivotally fixed to the seat base 16 via a bracket 120. With reference to FIG. 4, the lower linkage member 116 pivots about a rotational axis 122 offset the pivot axis 60 a distance d (FIG. 2). The retaining member 100 is operably coupled to the lower linkage member 116 such that pivotal movement of the lower linkage member 116 about the rotational axis 122 while the seat back 20 pivots toward the seat base 16 results in translational movement of the retaining member away from the striker 64.

With reference to FIG. 2, the lever 110 connects to the seat back 20 (more particularly, the seat back frame, which is not shown) via an axle 124 for rotation about the lever axis 112 (FIG. 3). As illustrated, the lever 110, the first rod 114, the second rod 116 and the dimension d are dimensioned such that the retaining member 100 engages the striker 64 after the striker has cleared the webbing section 48 when the seat back 20 is moving away from the seat base 16. In the depicted embodiment, the lever 110, the first rod 114, the second rod 116 and the dimension d can also be dimensioned such that the retaining member 100 disengages from the striker 64 only after the striker has cleared the webbing section 48 when the seat back 20 is moving toward the seat base 16. As seen in FIG. 3, the lower linkage member 116 can have a length $L_L$ between the rotational axis 122 and where the lower linkage member connects with the lever 110. The lever 110 can be designed to have a first lever arm distance $D_1$ between the rotational axis 112 and where the lower linkage member connects and a second lever arm distance $D_2$ between the rotational axis 112 and where the upper linkage member 114 connects. The upper linkage member 114 can have a length $L_u$ between where the upper linkage member connects with the lever 110 and the retaining member 100. The distances LL, LU, D1 and D2 and the distance d that the rotational axis 122 is offset from the pivot axis 60 can be such that the retaining member 100 engages with the striker 64 after the striker has cleared the webbing section 46 when the seat back 20 is moving in the second direction 72, which is away from the seat base 16. If the striker 64 were to remain in the extended position prior to clearing the webbing 46 when the seat back 20 is moving away from the seat base 16, then the striker 64 could engage the seat belt webbing dragging the seat belt webbing toward the latch mechanism 30. This could be undesirable. The distances LL, LU, D1 and D2 and the distance d that the rotational axis 122 is offset from the pivot axis 60 can also be such that the retaining member 100 disengages from the striker 64 after the striker has cleared the webbing section 46 when the seat back 20 is moving in the first direction 70, which is toward the seat base 16.

As mentioned above, vehicle seat 10 also includes a second linkage 104 connected with the striker 64. The second linkage 104 moves the striker 64 from the extended position toward the retracted position in response to movement of the seat back 20 in the first direction 70, e.g. movement of the seat back 20 toward the seat base 16. The second linkage 104 includes a lever member 140 pivotable about a lever member axis 142, a first linkage element 144 connected to the lever member 140 on a first side of the cable lever axis and a second linkage element 146 connected to the lever member 140 on a second, opposite, side of the lever axis. The first linkage element 144 also connects to the striker 64 and extends through the inboard opening 92 in the inboard wall 86 of the receptacle 80. The second linkage element 146 is also fixed to the seat back, which in the illustrated embodiment is via the bracket 120.

In the illustrated embodiment and with reference to FIG. 3A, the lever member 140 is generally T-shaped including a first opening 152 that receives an axle 154, which can be connected with the seat back frame (not shown) having a central axis coincident with the lever member axis 142. The first opening 152 can be located on a central leg 156 distal from a cross leg 158. The cross leg 158 can include a first connection location 162, which can be an opening, on a first side of the central leg and a second connection location 164, which can also be an opening, on opposite side of the central leg. The first linkage element 144 connects at the first connection location 162 and the second linkage element 146 connects at the second connection location 164. The linkage elements 144 and 146 can be cables.

The second linkage element 146 connects to the seat base 16 at the location rearwardly offset a distance D, which can be the same as the distance d, from the pivot axis 60 such that movement of the seat back 20 in the first direction 70, which is movement of the seat back 20 toward the seat base 16, results in movement of the lever member 140 to retract the striker 64 from the extended position toward the retracted position. When the striker 64 is in the extended position, the first linkage element 144 can have a length L1 (FIG. 3A) between the striker 64 and where the first linkage member connects with the lever member 140. The lever member 140 can be designed to have a first lever arm distance $D_A$ between the rotational axis 142 and where the first linkage element 144 connects and a second lever arm distance $D_B$ between the rotational axis 142 and where the second linkage element 146 connects. The second linkage element 146 can have a length $L_2$ (FIG. 3) between where the second linkage element 146 connects with the lever member 140 and the bracket 120. The distances $L_1$, $L_2$, $D_A$ and $D_B$ and the distance that the rotational axis 122 is offset from the pivot axis 60 can be such that the second linkage 104 moves the striker 64 into the retracted position before the striker has cleared the webbing section when the seat back 20 is moving toward the seat base 16.

A vehicle seat and a vehicle including the vehicle seat have been described with particularity with reference to the embodiment disclosed above. Modifications and alterations will occur to those upon reading and understanding the detailed description provided above. Such modifications are intended to be encompassed by the appended claims. For example, the two rigid rods 114 and 116 described above can be replaced by a single rigid rod, which can be pivotally fixed to the seat base 16. Such a single rigid rod would be pivotally fixed to the seat base at a location forwardly offset from the pivot axis 60. Additionally, one or both of the rods can be replaced by a cable; however, the cable should be able to sustain a compressive force without buckling. Additionally, the cable lever 140 could be replaced by a guide or a pulley. In such an embodiment, a single cable could be connected to the striker 64 and fixed to the seat base 16 at a location offset from the pivot axis 60. Movement of the seat back 20 toward the seat base 16 would result in the cable pulling the striker 64 from the extended position toward the retracted position. Some slack may be needed in the cable for this embodiment. Moreover, one or both of the cables could be replaced by a rod. Additionally, only the second linkage 104, which can move the striker 64 between the extended and the retracted position may be provided. In view of the above, all modifications and alterations that come within the scope of the appended claims are intended to be covered by the appended claims.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat comprising:
 a seat base;
 a seat back connected with the seat base for pivotal movement about a pivot axis;
 a striker on the seat back moveable in a linear direction between a retracted position where the striker is disposed in the seat back and an extended position where the striker extends from the seat back for engaging an associated latch, wherein the striker moves toward the retracted position in response to movement of the seat back in a first direction, which is toward the seat base, and, wherein the striker moves toward the extended position in response to movement of the seat back in a second direction, which is away from the seat base.

2. The seat of claim 1, wherein the seat back is moveable between a locked, upright position where the seat back is locked to an associated structural pillar and a stowed position where the seat back is folded toward or onto the seat base, wherein the striker remains in the retracted position while the seat back is moving in the second direction until the seat back is nearer the locked, upright position as compared to the stowed position.

3. The seat of claim 1 further comprising a moveable retaining member moveable from a first operating position, in which the retaining member engages with the striker to retain the striker in the retracted position, toward a second operating position, in which the retaining member disengages from the striker, in response to the seat back moving in the second direction.

4. The seat of claim 3 further comprising a biasing member biasing the striker in the linear direction toward the extended position, wherein the retaining member acts against the striker to retain the striker in the retracted position when the retaining member is in the first operating position.

5. The seat of claim 3, further comprising a linkage member pivotally fixed to the seat base at a rotational axis offset from the pivot axis, wherein the retaining member is operably coupled to the linkage member such that pivotal movement of the linkage member about the rotational axis results in translational movement of the retaining member.

6. The seat of claim 3, further comprising a linkage including a lever pivotable about a lever axis, a first linkage member connected to the lever on a first side of the lever axis and a second linkage member connected to the lever on a second, opposite, side of the lever axis, wherein the first linkage member also connects to the retaining member and the second linkage member is pivotally fixed to the seat base offset from the pivot axis.

7. The seat of claim 6 further comprising an additional linkage connected with the striker, wherein the additional linkage moves the striker from the extended position toward the retracted position in response to the seat back moving in the first direction.

8. The seat of claim 7, wherein the additional linkage includes a cable fixed to the seat base at a location offset from the pivot axis.

9. The seat of claim 7, wherein the additional linkage includes a lever member pivotable about a lever member axis, a first linkage element connected to the lever member on a first side of the lever member axis and a second linkage element connected to the lever member on a second, opposite, side of the lever member axis, wherein the first linkage element also connects to the striker and the second linkage element is fixed to the seat back offset from the pivot axis.

10. The seat of claim 9, wherein the first linkage member and the second linkage member each are a rigid rod, and wherein the first linkage element and the second linkage element each are a cable.

11. A motor vehicle comprising:
 a structural pillar;
 a latch on the structural pillar;
 a vehicle seat including a seat base and a seat back connected with the seat base for pivotal movement about a pivot axis;
 a seat belt assembly including a webbing section extending from the structural pillar;
 a striker mechanism on the seat back, the striker mechanism including a striker moveable in a linear direction between a retracted position where the striker is disposed in the seat back and an extended position where the striker extends from the seat back to engage the latch, the striker mechanism being configured such that movement of the seat back in a first direction, which is toward the seat base, results in the striker moving toward the retracted position and movement of the seat back in a second direction, which is away from the seat back, results in the striker moving toward the extended position;
 a first linkage cooperating with the striker for retaining the striker in the retracted position, wherein the first linkage includes a lever pivotable about a lever axis, a first linkage member connected to the lever on a first side of the lever axis, and a second linkage member connected to the lever on a second, opposite, side of the lever axis, wherein the second linkage member is pivotally fixed to the seat base offset from the pivot axis a distance d;
 a second linkage cooperating with the striker for retracting the striker into the retracted position from the extended position;
 a biasing member biasing the striker toward the extended position; and
 a retaining member associated with the first linkage member for retaining the striker in the retracted position.

12. The vehicle of claim 11, wherein the striker is located on a lateral outboard side of the seat back.

13. The vehicle of claim 12, wherein the striker moves from the retracted position towards the extended position after the striker has moved rearwardly beyond the webbing section.

14. The vehicle of claim 11, wherein the lever, the first linkage member, the second linkage member and the distance d are dimensioned such that the retaining member engages the striker after the striker has cleared the webbing section when the seat back is moving away from the seat base.

15. The vehicle of claim 11, wherein the second linkage includes a lever member pivotable about a lever member axis, a first linkage element connected to the lever member on a first side of the lever member axis and a second linkage element connected to the lever member on a second, opposite, side of the lever member axis, wherein the first linkage element also connects to the striker and the second linkage element is fixed to the seat back offset from the pivot axis a distance D, wherein the lever member, the first linkage element, the second linkage element and the distance D are dimensioned such that the second linkage moves the striker into the retracted position before the striker has cleared the webbing section when the seat back is moving away the seat base.

16. The vehicle of claim 15, wherein at least one of the first linkage and the second linkage are configured to cooperate with the striker such that the striker remains in the retracted position until the striker clears the webbing section when the seat back is moving toward the seat base.

17. The vehicle of claim 16, wherein the first linkage is configured such that the retaining member remains engaged with the striker until the striker clears the webbing section when the seat back is moving toward the seat base.

18. A vehicle seat comprising:
a seat base;
a seat back connected with the seat base for pivotal movement about a pivot axis, the seat back including an outboard lateral side;
a receptacle extending into the seat back from the outboard lateral side;
a striker in the receptacle and moveable in a linear direction between a retracted position where the striker is disposed in the receptacle and an extended position where the striker extends from the receptacle and the outboard lateral side of the seat back;
a biasing member biasing the striker in the linear direction towards the extended position;
a retaining member moveable between a first operating position where the retaining member engages with the striker to retain the striker in the retracted position and a second operating position where the retaining member disengages from the striker so that the striker is biased toward the extended position; and
a linkage connected with the striker, wherein the linkage moves the striker from the extended position toward the retracted position in response movement of the seat back toward the seat base.

19. The vehicle seat of claim 18, wherein the linkage includes a lever member pivotable about a lever member axis, a first linkage element connected to the lever member on a first side of the lever member axis and a second linkage element connected to the lever member on a second, opposite, side of the lever member axis, wherein the first linkage element also connects to the striker and the second linkage element is fixed to the seat back offset from the pivot axis a distance D.

20. The vehicle seat of claim 18, further comprising an additional linkage connected with the retaining member, wherein the additional linkage includes a lever pivotable about a lever axis, a first linkage member connected to the lever on a first side of the lever axis, and a second linkage member connected to the lever on a second, opposite, side of the lever axis, wherein the retaining member is associated with the first linkage member for retaining the striker in the retracted position, wherein the second linkage member is pivotally fixed to the seat base offset from the pivot axis a distance d.

* * * * *